US008488452B2

(12) United States Patent
Murata

(10) Patent No.: US 8,488,452 B2
(45) Date of Patent: Jul. 16, 2013

(54) METHOD AND APPARATUS FOR DETERMINING RESOURCE NODE, METHOD OF CONTROLLING RESOURCE NODE, RESOURCE NODE, AND COMPUTER PRODUCT

(75) Inventor: Miho Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 11/706,220

(22) Filed: Feb. 15, 2007

(65) Prior Publication Data

US 2008/0069117 A1   Mar. 20, 2008

(30) Foreign Application Priority Data

Sep. 20, 2006   (JP) ................................ 2006-254207

(51) Int. Cl.
*H04L 12/26* (2006.01)
(52) U.S. Cl.
USPC .......................................................... 370/230
(58) Field of Classification Search
None
See application file for complete search history.

(56) References Cited

U.S. PATENT DOCUMENTS

| | | | |
|---|---|---|---|
| 4,800,488 A | | 1/1989 | Agrawal et al. |
| 5,802,396 A | * | 9/1998 | Gray .............................. 710/20 |
| 6,282,278 B1 | * | 8/2001 | Doganata et al. ......... 379/202.01 |
| 6,308,216 B1 | | 10/2001 | Goldszmidt et al. |
| 2002/0023119 A1 | * | 2/2002 | Gray et al. ..................... 709/104 |
| 2002/0110186 A1 | * | 8/2002 | Blakeney et al. ............. 375/220 |
| 2002/0120729 A1 | * | 8/2002 | Faccin et al. .................. 709/223 |
| 2003/0120600 A1 | * | 6/2003 | Gurevich ......................... 705/50 |
| 2003/0187978 A1 | | 10/2003 | Nakamura et al. |
| 2006/0047742 A1 | * | 3/2006 | O'Neill et al. ................. 709/203 |
| 2006/0178848 A1 | | 8/2006 | Iizuka et al. |
| 2008/0037764 A1 | * | 2/2008 | Lee et al. .................. 379/266.01 |

FOREIGN PATENT DOCUMENTS

| | | |
|---|---|---|
| JP | 2002-024192 | 1/2002 |
| JP | 2002-251292 | 9/2002 |
| JP | 2004-30204 | 1/2004 |
| JP | 2004-521411 | 7/2004 |
| JP | 2006-031358 | 2/2006 |
| JP | 2006-221382 | 8/2006 |
| WO | 99/06913 | 2/1999 |
| WO | 2006/029771 | 3/2006 |

OTHER PUBLICATIONS

Korean Patent Office Action, mailed Jan. 21, 2008 and issued in corresponding Korean Patent Application No. 10-2007-0017803.
Extended European Search report issued in corresponding European Patent Application No. 07003158.8, on Oct. 18, 2007.
Japanese Office Action issued Apr. 6, 2010 in corresponding Japanese Patent Application 2006-254207.
Japanese Office Action mailed Apr. 5, 2011 for corresponding Japanese Patent Application 2006-254207.
Japanese Office Action mailed Oct. 12, 2010 in respect to corresponding Japanese Application No. 2006-254207.

* cited by examiner

*Primary Examiner* — Minh-Trang Nguyen
(74) *Attorney, Agent, or Firm* — Staas & Halsey LLP

(57) ABSTRACT

By transmitting information on a condition enabling execution of one service to a resource broker that manages an assignment state of a resource node used among services, a resource node enabling execution of one service out of resource nodes used among services is specified. And by receiving information on use state of the resource node out of the specified resource nodes and based on the information on the received use state, a resource node used for one service out of specified resource nodes is determined.

8 Claims, 11 Drawing Sheets

METHOD AND APPARATUS FOR DETERMINING RESOURCE NODE, METHOD OF CONTROLLING RESOURCE NODE, RESOURCE NODE, AND COMPUTER PRODUCT

CROSS-REFERENCE TO RELATED APPLICATIONS

This application is based upon and claims the benefit of priority from the prior Japanese Patent Application No. 2006-254207, filed on Sep. 20, 2006, the entire contents of which are incorporated herein by reference.

BACKGROUND OF THE INVENTION

1. Field of the Invention

The present invention relates to a technology of a resource node assignment in a distributed computers environment.

2. Description of the Related Art

Conventionally, when access from users concentrates on one service, or a service requiring a large quantity of calculation jobs is performed, for the load sharing, a distributed computer environment is used where a large number of computers are connected via networks, for example, a grid environment in which different types of computers are intermingled.

In this case, the optimal computer (hereafter "resource node") suitable for the purpose of one service must be selected automatically and quickly among a large number of computers to be assigned to the service. Especially, in the grid environment in which different types of computers are intermingled, the performance of the whole service depends strongly on the assigned resource node.

For this reason, to improve the performance of the whole service, a resource node depending on each service is assigned based on, for example, information on the performance of each resource node and a use environment.

Specifically, for example, a service administrator requests a resource required for the service from a resource broker that performs the brokering of resource nodes used among a plurality of services. A resource broker searches a resource node that satisfies this request from a resource node group, and assigns a resource node used for service based on the search results (for example, Japanese Patent Laid-open Publication No. 2002-024192, Published Japanese Translation of PCT application No. 2004-521411, and Japanese Patent Laid-open Publication No. 2006-031358).

However, in the conventional techniques of the patent documents 1 to 3 mentioned above, the initiation instruction of an application required for service is performed to each resource node after being assigned as the resource node used for the service. Namely, the assignment of a resource node used for one service is performed, while the initiation of the application in each assigned resource node is not guaranteed.

For this reason, there has been a problem that the service could not be provided because of a resource node required for performing service not being prepared, when, in each resource node, a host-down has occurred just before the initiation of an application, an initiation instruction could not be received due to a temporary communication trouble, or the like.

Moreover, at the time of selecting the resource node actually used for the service among resource nodes capable of providing the service, the selection criterion is uniquely decided by the resource broker.

However, since the selection criteria differ for every service in many cases, the selection criteria for every service must be understood beforehand and a resource broker based on them must be developed. For this reason, there has been a problem that when services to be performed increase or distributed computer environment is used for other services, the addition and change of selection criteria cannot be flexibly performed, resulting in poor versatility.

To solve the aforementioned problems in the conventional techniques, the present invention aims at providing a resource node determination program realizing the smooth provision of each service, a resource node control program, a recording medium, a resource node determination apparatus, a resource node, a resource node determination method, and a resource node control method.

SUMMARY OF THE INVENTION

It is an object of the present invention to at least solve the above problems in the conventional techniques A computer-readable recording medium according to one aspect of the present invention stores therein a resource node determination program. The resource node determination program causes a computer to execute transmitting information on a condition enabling execution of a service to a resource broker that manages assignment of resource nodes that are used for a plurality of services; receiving information on a use state of specific nodes from the specific nodes satisfying the condition among the resource nodes; and determining a resource node to be used for the service from among the specific nodes based on the information on the use state.

A computer-readable recording medium according to another aspect of the present invention stores therein a resource node control program. The resource node control program causes a computer to execute receiving, when a resource node performing a software resource required for execution of a first service selected from among a plurality of services satisfies a condition enabling execution of a second service that is newly selected from among the services, a request for initiation of a software resource required for execution of the second service from a determination apparatus that determines whether to use the resource node for each of the first service and the second service; initiating the software resource required for the execution of the second service when the request is received; transmitting to the determination apparatus, when the software resource required for the execution of the second service is initiated, a notice of initiation completion of the software resource required for the execution of the second service; receiving a result of determination whether the resource node is used for the second service from the determination apparatus, the determination made in response to the notice; and terminating execution of one of the software resource required for the first service and the software resource required for the second service, based on the determination.

A resource node determination apparatus according to still another aspect of the present invention includes a transmitting unit that transmits information on a condition enabling execution of a service to a resource broker that manages assignment of resource nodes that are used for a plurality of services; a receiving unit that receives information on a use state of specific nodes from the specific nodes satisfying the condition among the resource nodes; and a determining unit that determines a resource node to be used for the service from among the specific nodes based on the information on the use state.

A resource node according to still another aspect of the present invention includes a first receiving unit that receives, when a resource node performing a software resource required for execution of a first service selected from among a plurality of services satisfies a condition enabling execution of a second service that is newly selected from among the services, a request for initiation of a software resource required for execution of the second service from a determination apparatus that determines whether to use the resource node for each of the first service and the second service; an initiating unit that initiates the software resource required for the execution of the second service when the request is received; a transmitting unit that transmits to the determination apparatus, when the software resource required for the execution of the second service is initiated, a notice of initiation completion of the software resource required for the execution of the second service; a second receiving unit that receives a result of determination whether the resource node is used for the second service from the determination apparatus, the determination made in response to the notice; and a terminating unit that terminates execution of one of the software resource required for the first service and the software resource required for the second service, based on the determination.

A resource node determination method according to still another aspect of the present invention includes transmitting information on a condition enabling execution of a service to a resource broker that manages assignment of resource nodes that are used for a plurality of services; receiving information on a use state of specific nodes from the specific nodes satisfying the condition among the resource nodes; and determining a resource node to be used for the service from among the specific nodes based on the information on the use state.

A resource node control method according to still another aspect of the present invention includes receiving, when a resource node performing a software resource required for execution of a first service selected from among a plurality of services satisfies a condition enabling execution of a second service that is newly selected from among the services, a request for initiation of a software resource required for execution of the second service from a determination apparatus that determines whether to use the resource node for each of the first service and the second service; initiating the software resource required for the execution of the second service when the request is received; transmitting to the determination apparatus, when the software resource required for the execution of the second service is initiated, a notice of initiation completion of the software resource required for the execution of the second service; receiving a result of determination whether the resource node is used for the second service from the determination apparatus, the determination made in response to the notice; and terminating execution of one of the software resource required for the first service and the software resource required for the second service, based on the determination.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained in detail below with reference to the accompanying drawings.

Figure 1:
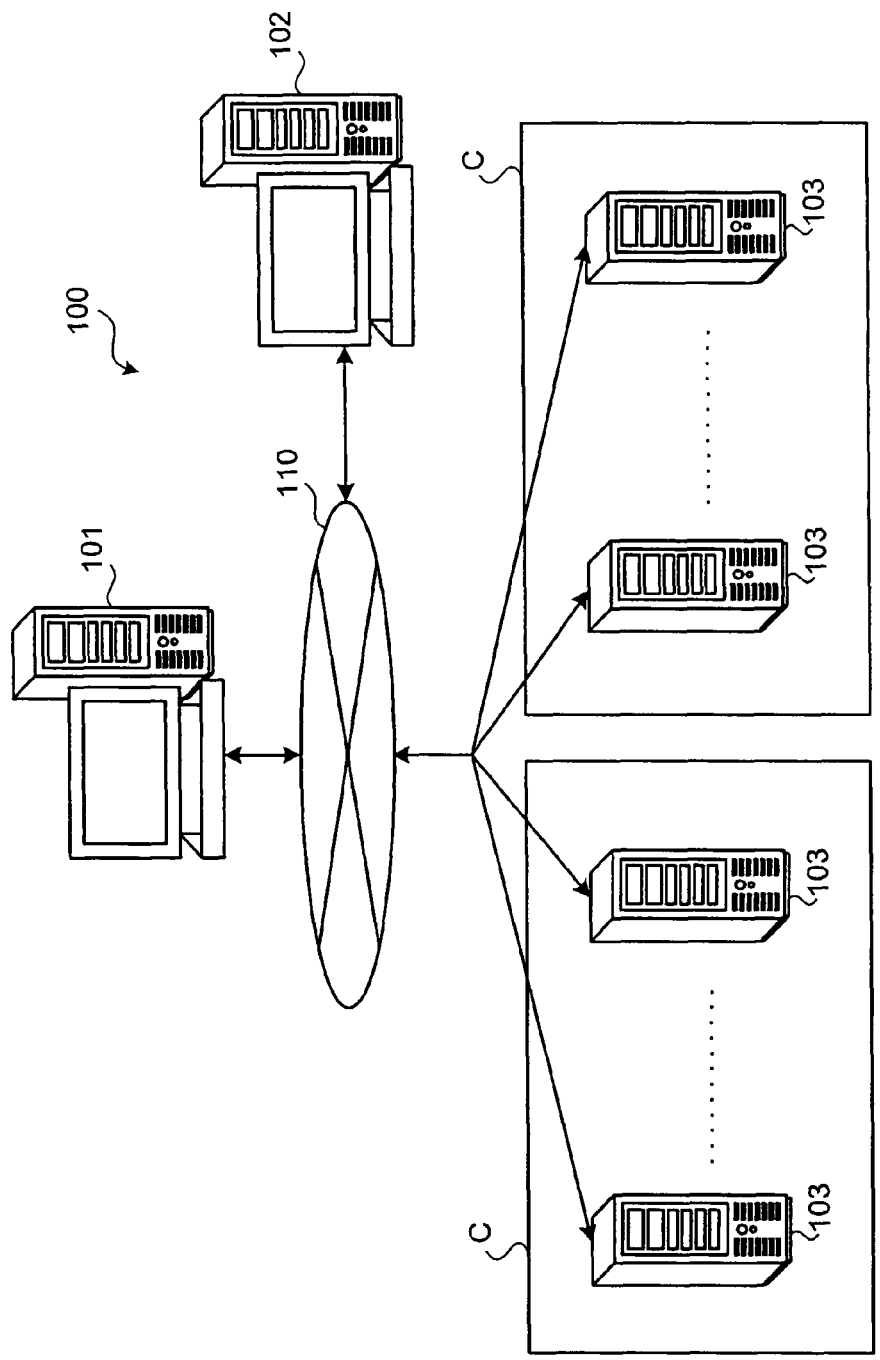
FIG. 1 is a schematic of a resource node determination system according to an embodiment of the present invention.

FIG. 1 is a schematic of a resource node determination system according to an embodiment of the present invention. As shown in FIG. 1, in a resource node determination system 100, a resource node determination apparatus 101, a resource brokering apparatus 102, and resource nodes 103 installed in each site C are connected via a network 110.

The resource node-determination apparatus 101 is a computer device that submits a condition set depending on load for every service to the resource brokering apparatus 102 and requires the resource nodes 103 required for the execution of service.

Moreover, the resource node determination apparatus 101 is a computer device that determines the assignment of the resource nodes 103 to each service. Furthermore, the resource node determination apparatus 101 is a computer device that manages each resource node 103 by communicating with the resource node 103 assigned to each service.

The resource brokering apparatus 102 is a computer device that manages the assignment state of the resource node 103 used in services. Specifically, the resource brokering apparatus 102 is a computer device that, to satisfy the condition submitted from the resource node determination apparatus 101, determines whether the execution of service is attained by assigning which resource node 103 of which site C.

The resource nodes 103 are installed in each site C and are computer devices used for performing service. Specifically, the resource node 103 is a computer device that provides a terminal (not shown) with the service assigned by the resource node determination apparatus 101.

Figure 2:
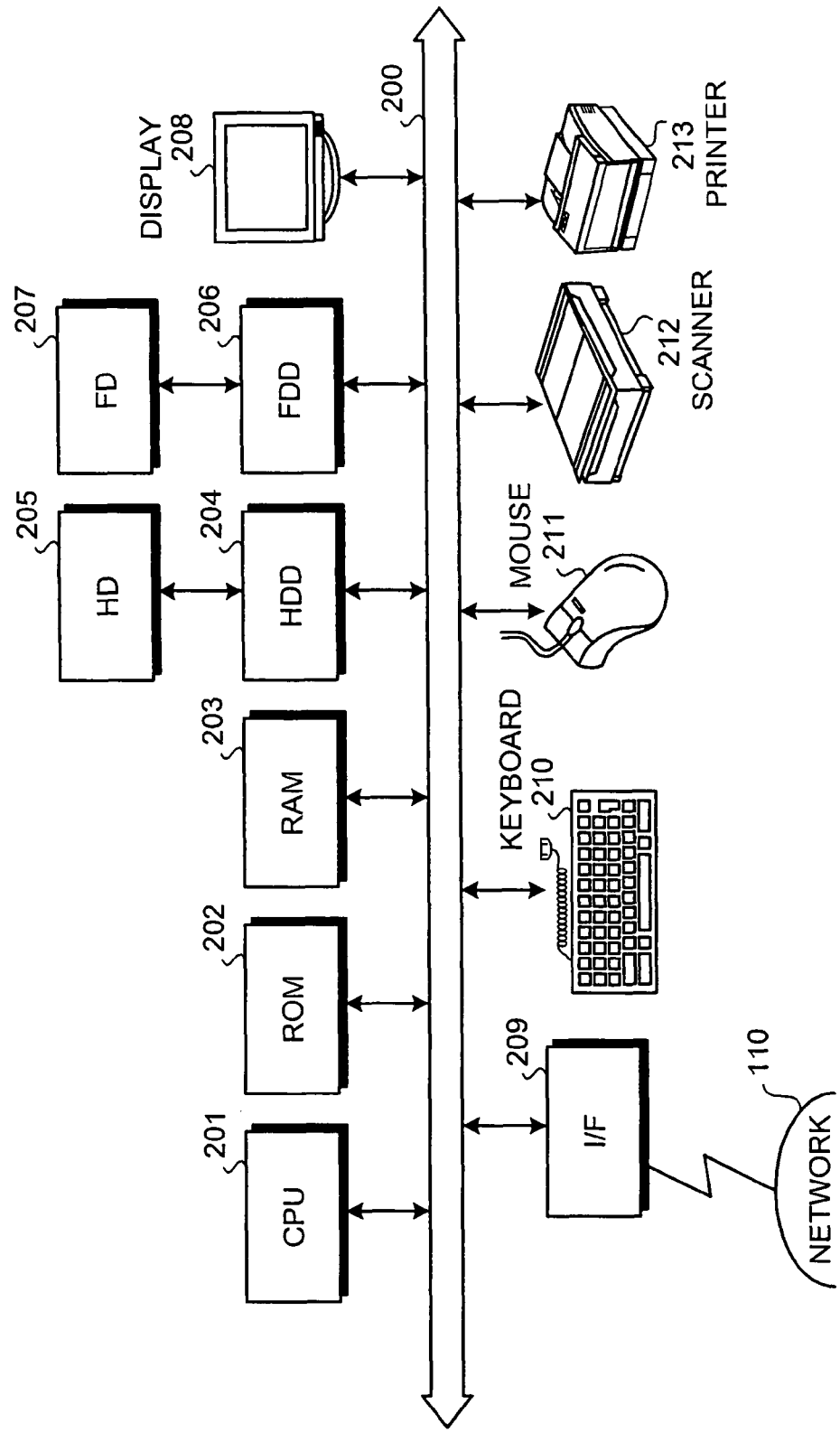
FIG. 2 is a block diagram of a computer device shown in FIG. 1.

FIG. 2 is a block diagram of the computer device shown in FIG. 1. As shown in FIG. 2, the computer device includes a central processing unit (CPU) 201, a read-only memory (ROM) 202, a random access memory (RAM) 203, a hard disk drive (HDD) 204, a hard disk (HD) 205, a flexible disk drive (FDD) 206, a flexible disk (FD) 207 as an example of a removable recording medium, a display 208, an interface (I/F) 209, a keyboard 210, a mouse 211, a scanner 212, and a printer 213. Moreover, each component part is respectively connected by a bus 200.

Here, the CPU 201 manages the control of the whole computer equipment. The ROM 202 records programs such as a boot program. The RAM 203 is used as a work area of the CPU 201. The HDD 204 controls the read/write of data to the HD 205 according to the control of the CPU 201. The HD 205 stores data written by the control of the HDD 204.

The FDD 206 controls the read/write of data to the FD 207 according to the control of the CPU 201. The FD 207 stores data written by the control of the FDD 206, or causes the computer device to read data stored by the FD 207.

Moreover, as a removable recording medium, a compact disc read-only memory (CD-ROM), a compact disc recordable (CD-R), a compact disc rewritable (CD-RW), a magneto optical (MO) disk, a digital versatile disk (DVD), a memory card, or the like besides the FD 207 can be used. The display 208 displays a cursor, an icon, a toolbox, and data such as a document, an image, or functional information. The display 208 can employ a cathode ray tube (CRT) display, a thin-film transistor (TFT) liquid crystal display, a plasma display, or the like.

The I/F 209 is connected to the network 110, such as an internet, through a communication line, and then connected to other apparatuses through this network 110. The I/F 209 manages the network 110 and interfaces therein to control the input/output of data from an external apparatus. The I/F 209 can employ, for example a modem or a LAN adapter.

A keyboard 210 is provided with a key for inputting a character, a numeral, or various directions, or the like, and performs data input. Moreover, it may be a touch-sensitive input pad, a numeric keypad, or the like. The mouse 211 performs functions such as movement of cursor, a range selection, movement of a window, a change of size. It may be a trackball, a joystick, or the like if they have the similar function as a pointing apparatus.

The scanner 212 optically reads an image and captures the image data therein. Incidentally, the scanner 212 may have an optical character recognition (OCR) function. Moreover, the printer 213 prints an image data or a document data. As the printer 213, for example, a laser printer, an ink jet printer, can be employed.

Figure 3:
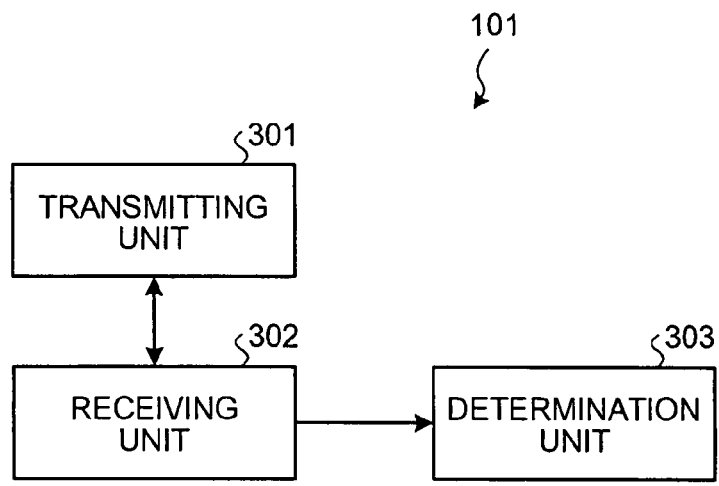
FIG. 3 is a block diagram of a resource node determination apparatus according to the embodiment.

FIG. 3 is a block diagram of the resource node determination apparatus 101 according. As shown in FIG. 3, the resource node determination apparatus 101 is constituted with a transmitting unit 301, a receiving unit 302, and a determining unit 303.

The transmitting unit 301 transmits information on the condition enabling execution of one service to a resource broker (the resource brokering apparatus 102 shown in FIG. 1) that manages the assignment state of a resource node (the resource node 103 shown in FIG. 1) that is used among services.

Here, the service is information processing provided for a computer terminal of the resource node, including a non-interactive service, such as batch processing of a simulation job, and an interactive service, such as an Internet telephone and a video conference system.

Moreover, the condition enabling execution of one service shows, for example, the performance and the number of resource nodes needed at the minimum for performing one service. More specifically, the condition may include "memory capacity: more than 512 megabytes (MB), OS: Windows (registered trademark), the number of resource nodes: five-sets" or the like.

This condition is set in the resource node determination apparatus 101 depending on the service load for every service. Specifically, this condition may be set by directly inputting to the resource node determination apparatus 101 or by receiving from an external computer device through the network 110.

Based on the information on the condition from the resource node determination apparatus 101, the resource broker specifies a resource node satisfying the condition among the resource nodes used among services. At this time, the resource broker may specify the more number of resource nodes than the number needed at the minimum.

Specifically, for example, the resource broker specifies the resource node satisfying the condition, by using static information, including a CPU performance, a usable OS, an application software installed, and dynamic information, including a CPU usage rate, a memory usage rate, or the like in each resource node.

Moreover, the resource broker inquires the current use state to all the specified resource nodes, while requiring that the information on each use state should be transmitted to the resource node determination apparatus 101. At this time, the resource broker may transmit the IP address of the resource node determination apparatus 101 to each specified resource node.

Namely, the resource broker does not assign the resource node actually used for one service, but specifies the resource node satisfying the condition that enables the execution of one service. The resource broker then performs the notice request for notifying the information on the use state to the resource node determination apparatus 101, to each resource node. A series of processing performed by such the resource broker is here referred to as managing the assignment state of a resource node.

As a result of being transmitted the information on the condition enabling the execution of one service by the transmitting unit 301, the receiving unit 302 receives, from the nodes satisfying the condition among the resource nodes used by services, the information on the use states of the specific resource nodes.

Specifically, the receiving unit 302 receives, from resource nodes specified by the resource broker, the information on the use state of each resource node. Note herein that each specified resource node may transmit the information on the use state to the resource node determination apparatus 101 based on the IP address of the resource node determination apparatus 101 transmitted from the resource broker.

Here, the information on the use state of a resource node is, for example, information showing the use state about the software resource in the resource node. Specifically, it may be information showing an OS, an application, or the like currently performed in each resource node.

Moreover, the information on the use state of a resource node may include, for example, information showing the use state about the hardware resource in the resource node. Specifically, it may be information showing a current CPU usage rate, a current memory usage rate, or the like in each resource node.

Furthermore, the information on the use state of a resource node may include, for example, the information on the transmission speed at the time of the resource node performing communication with other external apparatus. Specifically, it may be information showing a network bandwidth (frequency bandwidth) in use in each resource node, information showing a location where each resource node is installed (information for computing a physical distance from the external apparatus that serves as a communication partner), or the like.

The determining unit 303 determines a resource node used for one service out of the specific resource nodes based on the information on the use state received by the receiving unit 302. Specifically, the determining unit 303 may determine a resource node used for one service out of the specific resource nodes in the order in which the information on the use state is received by the receiving unit 302.

Namely, the determining unit 303 determines a resource node actually used for one service among the specific resource nodes in quick order of the notice of the information on the use state. In this case, the determination of the resource node by the determining unit 303 is performed until the number of the resource nodes enabling the execution of one service is satisfied.

Moreover, the communication delay in each resource node is different depending on the network bandwidth (transmission speed) used in each resource node. In consideration of the difference in this communication delay, the determining unit 303 may determine a resource node with high transmission speed as the resource node used for one service among the specific resource nodes.

Furthermore, based on, in the information on the use state received by the receiving unit 302, the information on whether the switching of the software resource required for the execution of one service in a specific resource node is necessary, the determining unit 303 may determine a resource node used for the one service out of the specific resource nodes.

For example, the switching of an OS may be required for the initiation of an application required for the execution of one service. In such a case, the time consumed for the switching of the OS occurs, resulting in much time before the execution of the needed application. In consideration of the time for the switching of the OS, the determining unit 303 may determine a resource node with no need for the switching of the OS as the resource node used for one service.

Moreover, based on, in the information on the use state received by the receiving unit 302, the information on whether a software resource required for the execution of one service in a specific resource node is performed, the determining unit 303 may determine a resource node used for the one service out of the specific resource nodes.

For example, it is assumed that although the application required for the execution of one service is an application a, an application under execution in a resource node is an application b. In this case, for example, the processing for halting the application b and initiating the application a is necessary in the resource node, and thereby it takes time for the initiation of the application required for the execution of one service.

In consideration of the time for the initiation (execution) of the software resource, the determining unit 303 may determine a resource node, in which the application required for the execution of one service is initiated beforehand, as the resource node used for one service.

Moreover, when the information on the use state is received by the receiving unit 302, the transmitting unit 301 may transmit, to the specific resource node, the initiation request of the software resource required for the execution of one service in the specific resource node.

In this case, as a result of the initiation request being transmitted by the transmitting unit 301, the receiving unit 302 may receive the notice of the initiation completion from the specific resource node. The notice of the initiation completion is a response signal showing that the initiation of the software resource required for the execution of one service is completed. The determining unit 303 may then determine a resource node used for one service out of the specific resource nodes in the order in which the notice of the initiation completion is received by the receiving unit 302.

Namely, among the specific resource nodes, the determining unit 303 determines a resource node, which transmitted the notice of the initiation completion, as the resource node used for one service, in quick order of the notice of the initiation completion showing that the initiation of the application required for the execution of one service is completed.

Note herein that although it is assumed that the resource node determination apparatus 101 and the resource broker are separately housed, they may be housed in a common housing. For example, the resource broker may be provided in the housing of the resource node determination apparatus 101.

Figure 4:
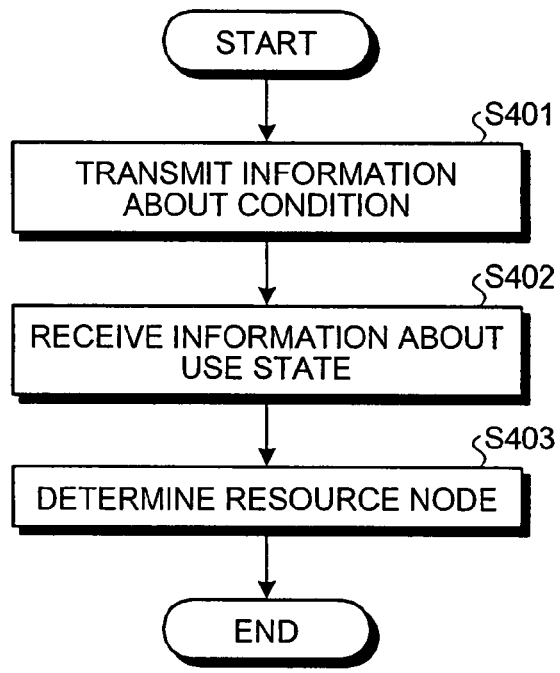
FIG. 4 is a flowchart of a resource node determination process performed by the resource node determination apparatus.

FIG. 4 is a flowchart of the resource node determination process performed by the resource node determination apparatus 101. As shown in the flowchart of FIG. 4, first, the transmitting unit 301 transmits the information on the condition enabling the execution of one service to the resource broker that manages the assignment state of a resource node used among services (step S401).

Next, as a result of the transmitting unit 301 transmitting the information on the condition enabling the execution of one service, the receiving unit 302 receives, from the node satisfying the condition among the resource nodes used by services, the information on the use state of the specific resource node (step S402).

Lastly, the determining unit 303 determines a resource node used for one service out of the specific resource nodes based on the information on the use state received by the receiving unit 302 (step S403), and a series of the process is finished.

As described above, according to the resource node determination apparatus 101, the resource node used for service can be determined in consideration of the use state from each resource node and the response speed of the information thereof. Thus, by performing the efficient assignment of resource to service, the respective services can be smoothly provided.

Moreover, according to the resource node determination apparatus 101, the determination condition at the time of determining a resource node used for one service out of the specific resource nodes can be arbitrarily set for every service. For this reason, it can flexibly respond to the addition and change of service provided.

Figure 5:
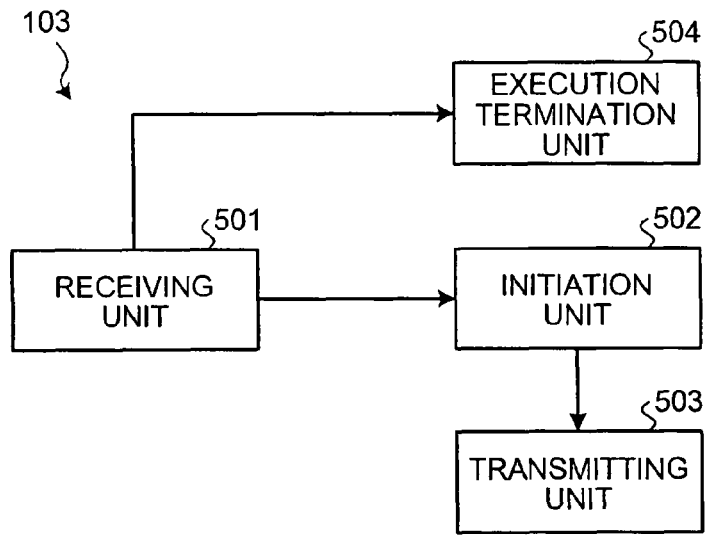
FIG. 5 is a block diagram of a resource node according to the embodiment.

FIG. 5 is a block diagram of a resource node 103 according to the embodiment. As shown in FIG. 5, the resource node 103 is constituted with a receiving unit 501, an initiating unit 502, a transmitting unit 503, and an execution terminating unit 504.

When the resource node 103 performing the software resource required for execution of a first service selected from services satisfies the condition enabling the execution of a newly selected second service, the receiving unit 501 receives the initiation request of the software resource required for the execution of the second service from the resource node determination apparatus for determining the adoption or rejection of use in each service (the resource node determination apparatus 101 shown in FIG. 1).

Specifically, the resource node 103 is used for the first service to perform the software resource required for the execution of the first service. In this situation, when the resource node 103 further satisfies the condition enabling the execution of the second service, it receives the initiation request of the software resources required for the execution of the second service from the resource node determination apparatus.

When the initiation request is received by the receiving unit 501, the initiating unit 502 initiates the software resource required for the execution of the second service. Specifically, when the initiation request is received by the receiving unit 501, the resource node 103 is performing both the software resource required for the execution of the first service and the software resource required for the execution of the second service.

When the software resource required for the execution of the second service is initiated by the initiating unit 502, the transmitting unit 503 transmits the notice of the initiation completion of the software resource required for the execution of the second service to the resource node determination apparatus. The notice of the initiation completion is a response signal showing that the initiation of the software resource required for the execution of the second service is completed.

Moreover, as a result of the notice of the initiation completion having been transmitted by the transmitting unit 503, the receiving unit 501 receives the determination result of the adoption or rejection of use in the second service to the resource node 103 from the resource node determination apparatus. The determination of the adoption or rejection of use in the second service is performed, in the resource node determination apparatus, for example, based on the notice of the initiation completion transmitted from the transmitting unit 503.

The execution terminating unit 504 terminates the execution of the software resource in the resource node 103. Specifically, based on the determination result received by the receiving unit 501, the execution terminating unit 504 terminates the execution of either of the software resource required for the execution of the first service and the software resource required for the execution of the second service.

More specifically, when the determination result received by the receiving unit 501 is the determination result in which the adoption is permitted for use in the second service, the execution terminating unit 504 may terminate the execution of the software resource required for the execution of the first service.

Moreover, when the determination result received by the receiving unit 501 is the determination result in which the adoption is refused for use in the second service, the execution terminating unit 504 may terminate the execution of the software resource required for the execution of the second service.

Figure 6:
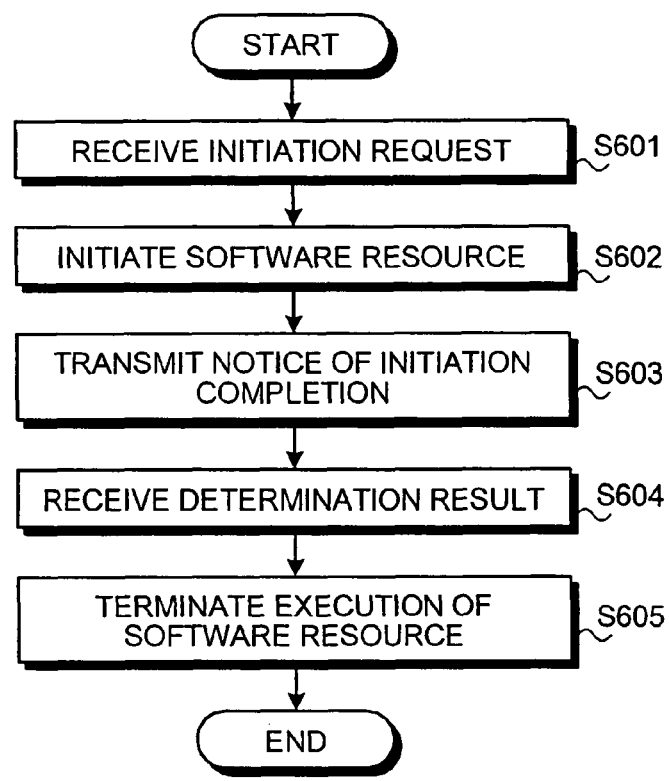
FIG. 6 is a flowchart of a resource node control process performed by the resource node.

FIG. 6 is a flowchart of the resource node control process performed by the resource node 103. In the flowchart shown in FIG. 6, first, when, while the software resource required for the execution of the first service selected from services is performed, the condition enabling the execution of the newly selected second service is satisfied, the receiving unit 501 receives the initiation request of the software resource required for the execution of the second service from the resource node determination apparatus for determining the adoption or rejection of use in each service (step S601).

Next, when the initiation request is received by the receiving unit 501, the initiating unit 502 initiates the software resource required for the execution of the second service (step S602). When the software resource required for the execution of the second service is initiated by the initiating unit 502, the transmitting unit 503 transmits the notice of the initiation completion of the software resource required for the execution of the second service to the resource node determination apparatus (step S603).

Next, as a result of the notice of the initiation completion having been transmitted by the transmitting unit 503, the receiving unit 501 receives the determination result of the adoption or rejection of use in the second service to the resource node 103 from the resource node determination apparatus (step S604).

Lastly, based on the determination result received by the receiving unit 501, the execution terminating unit 504 terminates the execution of either of the software resource required for the execution of the first service and the software resource required for the execution of the second service (step S605) and a series of the processing is finished.

As described above, according to the resource node 103 according to the embodiment of the present invention, even if it is in the state used for the first service, the software resource required for the execution of the second service can be performed. Furthermore, according to the determination result of the adoption or rejection of the second service, the execution of an unnecessary software resource can be terminated.

Hence, processing such as a temporary halt of the software resources required for the execution of the first service when the adoption is refused for use in the second service can be avoided, and thereby the load for the resource node 103 can be reduced.

In a first embodiment of the present invention, the case in which the use state is inquired of more resource nodes 103 than the number requested for service execution, and it is adopted as a resource node 103 used for service in quick order of the notice of the use state to the resource node determination apparatus 101 will be described.

Figure 7:
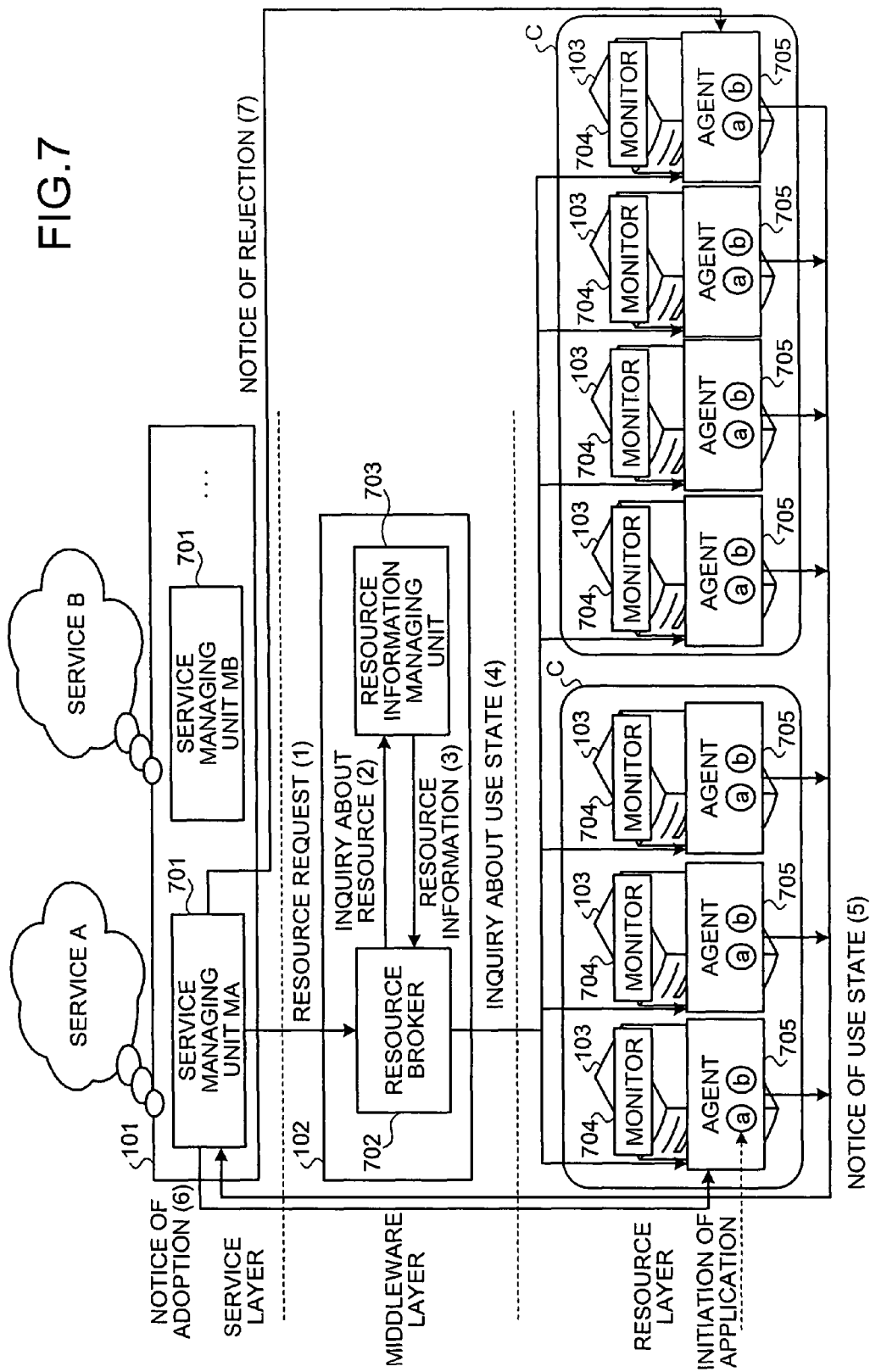
FIG. 7 is a diagram showing an outline of a resource node determination system according to a first embodiment of the present invention.

FIG. 7 is a diagram showing an outline of a resource node determination system according to the first embodiment.

As shown in FIG. 7, the resource node determination system is constituted with a resource layer to which a plurality of resource nodes 103 (here, seven sets) belong, a service layer to which a service performed by using resource nodes 103 belongs, and a middleware layer that manages the assignment state of the resource nodes 103 used by services.

The resource node determination apparatus 101 is constituted with a service managing unit 701 (for example, a service managing unit MA and a service managing unit MB) prepared for every service (for example, a service A and a service B). The service managing unit 701 requests the resource nodes 103 from a resource broker 702 mentioned later according to the load added to each service (refer to (1) as shown in FIG. 7), and manages the resource nodes 103 assigned to each service.

Moreover, in the service managing unit 701, the condition requested of the resource broker 702, such as the performance and the number of resource nodes 103, can be set. Specifically, the administrator of the service A can set the performance and the number of resource nodes 103 required for the service A in the service managing unit MA. Here, it is assumed that "memory capacity: more than 512 MB, OS: Windows, the number of resource nodes: five-sets" are set as the condition requested of the resource broker 702 in the service managing unit MA.

Furthermore, in the service managing unit 701, the adoption condition at the time of determining the resource nodes 103 used for service can be arbitrarily set. For example, based on whether the switching of an OS is required for the initiation of an application, whether the re-initiation of a daemon is necessary, or the like, the adoption condition can be set. More specifically, for example, the adoption condition can be set as the adoption when the switching of the OS is unnecessary and as the rejection when the switching of the OS is necessary.

Note herein that hereinafter the resource means the resource nodes 103 needed in performing service requested of the resource broker 702 from the service managing unit 701. Namely, the five-sets of resource nodes 103 in each of which the memory capacity is more than 512 MB and the available OS is Windows is called the resource as a whole.

Furthermore, by communicating with an agent 705 of each resource node 103, the service managing unit 701 can grasp the use state of each resource node 103 actually used for service, or can grasp the number of all the resource nodes used 103.

The resource brokering apparatus 102 is constituted with the resource broker 702 and a resource information managing unit 703. The resource broker 702 receives the request of resource from each service managing unit 701, and inquires of the resource information managing unit 703, which will be described below, whether there are any resources satisfying the request (refer to (2) as shown in FIG. 7).

Moreover, the resource broker 702 receives the resource information from the resource information managing unit 703 (refer to (3) as shown in FIG. 7), and inquires the use state of each resource node 103 of all the resource nodes 103 that can be used for the service shown in the resource information (refer to (4) as shown in FIG. 7). At this time, the resource broker 702 transmits the information of the service managing unit 701, which has requested the resource, to all the resource nodes 103 that can be used for service.

The resource information is information on the resource that satisfies the request from the service managing unit 701, i.e., information on the resource nodes 103 that can be used for service. Specifically, it is information such as the IP address of the resource node 103 that can be used for service or the like. Moreover, the information of the service managing unit 701 is information, such as a service name, or the IP address of the service managing unit 701.

Furthermore, when there are the requests of resource from of the plural service managing units 701, for example, the service managing unit MA and the service managing unit MB, the resource broker 702 coordinates those requests. Note herein that the technology of coordinating the requests in the resource broker 702 is well-known technology.

The resource information managing unit 703 holds the information on all the resource nodes 103 belonging to the resource layer. Specifically, for example, the resource information managing unit 703 holds static information, such as the IP address, an available OS, CPU performance, application software installed of each resource node 103, and dynamic information, such as a CPU usage rate periodically collected from a monitors 704 that will be described below.

Moreover, when there is an inquiry of the resource from the resource broker 702, the resource information managing unit 703 searches the resource having been inquired from the currently maintained information, namely, the resource nodes 103 that satisfy the condition enabling the execution of service. The resource information managing unit 703 then gives the search results to the resource broker 702. Note that the technology performed in the resource information managing unit 703 is well-known technology.

The resource node 103 is provided with the monitor 704 and the agent 705, and is connected to each site C. At the time of a first time initiation of each resource node 103, the monitor 704 transmits the static information on the resource node 103 to the resource information managing unit 703 (not shown). Furthermore, the monitor 704 periodically transmits the dynamic information on the resource node 103 to the resource information managing unit 703 (not shown).

The agent 705 manages the initiation and halt of all the applications that operate in the resource node 103. Moreover, the agent 705 holds the information on the initiation of applications that operate in the resource node 103, for example, a currently in-use OS, an environment variable, information on daemon under operation, or the like.

Furthermore, when there is an inquiry of the use state from the resource broker 702, the agent 705 notifies the information on the use state of the resource node 103 to the service managing unit 701 (refer to (5) as shown in FIG. 7).

Specifically, based on the information on the service managing unit 701 transmitted together with the inquiry of the use state from the resource broker 702, the agent 705 transmits the information on the use state of the resource node 103 to the service managing unit 701 (for example, the service managing unit MA).

In quick order of the notice of the use state from the agent 705, the service managing unit 701 adopts the resource node as the resource node 103 used for service. Specifically, the adoption notice is transmitted to the resource node 103 to which the notice of the use state from the agent 705 is quick (refer to (6) as shown in FIG. 7).

Moreover, when the notice of the use state from the agent 705 is late and the required number of resource nodes 103 is prepared, the rejection notice is transmitted to the resource node 103 (refer to (7) as shown in FIG. 7).

Suppose that the use state is inquired of more resource nodes 103 than the number required for the service A. Note herein that it is assumed that for the execution of the service A, an application operated in each resource node 103 is the application a ("a" as shown in FIG. 7), and for the execution of the service B, an application operated in each resource node 103 is the application b ("b" as shown in FIG. 7).

Figure 8:
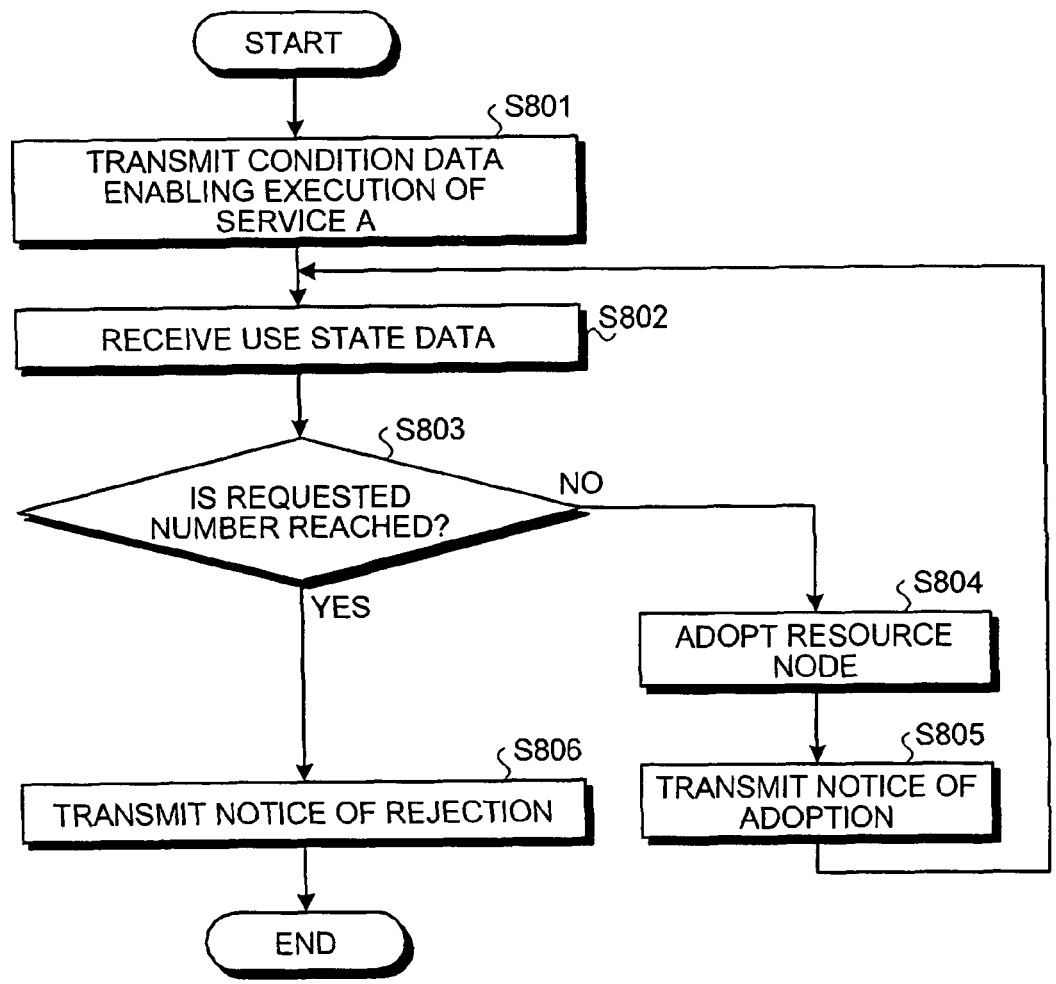
FIG. 8 is a flowchart of a resource node determination process performed by the resource node determination apparatus according to the first embodiment.

FIG. 8 is a flowchart of the resource node determination process performed by the resource node determination apparatus 101 according to the first embodiment. In the flowchart shown in FIG. 8, first, the service managing unit MA of the resource node determination apparatus 101 transmits the condition data enabling the execution of the service A to the resource broker 702 of the resource brokering apparatus 102 (step S801).

Suppose that "memory capacity: more than 512 MB, OS: Windows, the number of resource nodes: five-sets" are set as the condition for performing the service A in the service managing unit MA. For this reason, the service managing unit MA transmits the condition that five sets of resource nodes 103, in each of which the memory capacity is more than 512 MB and the available OS is Windows, are needed, as the condition data to the resource broker 702.

At step S801, as a result of transmitting the condition data enabling the execution of the service A, the use state data is received from the agent 705 of the resource node 103 that satisfies the condition enabling the execution of the service A (step S802).

Specifically, first, based on the condition data from the service managing unit MA, the resource broker 702 inquires the resource of the resource information managing unit 703, and receives the resource information on the resources enabling the execution of the service A. The resource broker 702 then inquires the current use state of the resource node 103 by using the IP address contained in this resource information. As a result of this, the notice of the use state is performed from the agent 705 of the resource node 103 to the service managing unit MA.

Next, it is determined whether the number of the resource nodes 103 used for the service A reaches the number requested as the condition (step S803). Namely, as a resource to be used for the service A, it is determined whether five sets of resource nodes 103, in each of which the memory capacity is more than 512 MB and the available OS is Windows, are secured.

Here, when the requested number is not reached (step S803: NO), the resource node 103 that is the transmitting origin of the use state data received at step S802 is adopted as the resource node 103 used for the service A (step S804). The adoption notice is then transmitted to the agent 705 of the adopted resource node 103 (step S805), and the procedure proceeds to step S802.

Specifically, the resource node 103 whose transmission of use state data is quicker is adopted, and the adoption notice showing that it is adopted as the resource node 103 used for the service A is transmitted. Note herein that the adoption notice includes the initiation request of the application a required for the execution of the service A, and the agent 705 that received the adoption notice initiates the application a corresponding to the initiation request.

Moreover, when the requested number is reached (step S803: YES), the rejection notice is transmitted to the agent 705 of the resource node 103 that is the transmitting origin of the use state data received at step S802 (step S806) and a series of the process may be finished.

Specifically, when the resource nodes 103 used for the service A reached the requested number, the rejection notice is transmitted to the agent 705 of the resource node 103 that has afterward transmitted the use state data.

According to the first embodiment, since the resource node 103 that actually returned the response of the use state is used for service, the number of the resource node 103 that is required for the execution of the service can be certainly prepared. Moreover, since it is adopted as the resource node 103 used for service in quick order of the response of the use state, the resource node can be effectively assigned in consideration of the communication delay due to the difference in network bandwidth.

Moreover, the adoption condition at the time of determining the resource nodes 103 used for service can be arbitrarily set for every service. For this reason, it can flexibly respond to the addition and change of service provided, and thereby excels in versatility.

In a second embodiment of the present invention, the case in which the resource node 103 used for service is adopted based on not only the response speed of the notice of the use state from the resource node 103 but also the adoption condition set beforehand in each service managing unit 701 will be described.

Figure 9:
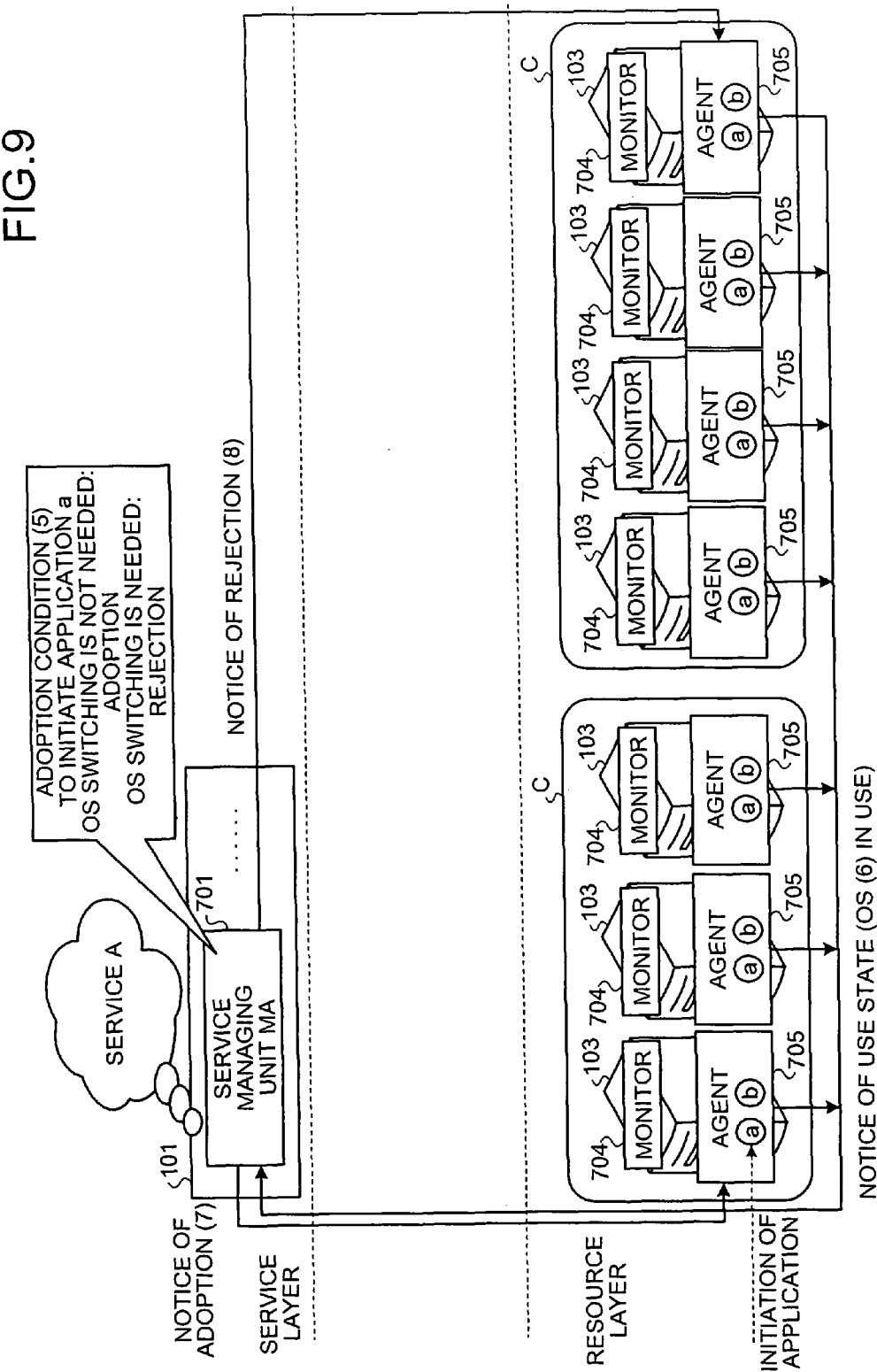
FIG. 9 is a diagram illustrating an outline of a resource node determination system according to a second embodiment of the present invention.

FIG. 9 is a diagram illustrating an outline of a resource node determination system according to the second embodiment. Since processing until the resource broker 702 inquires the use state of each resource node 103 is the same as the processing (1) to (4) shown in FIG. 7, the description and illustration are omitted here.

In the service managing unit MA of the service managing unit 701 shown in FIG. 9, the adoption condition at the time of adopting the resource node 103 used for the service A is beforehand set (refer to (5) as shown in FIG. 9). As the adoption condition, the condition in which a resource node is adopted when the OS switching is unnecessary for the initiation of the application a required for the execution of the service A and it is rejected when the OS switching is necessary is set.

Moreover, the determination of the adoption condition is performed in the order in which the notice of the use state from the agent 705 of the resource node 103 is received. The notice of the use state notified from the agent 705 of each resource node 103 to the service managing unit MA includes the information showing the OS in current use (refer to (6) as shown in FIG. 9).

The service managing unit MA determines whether it is adopted based on the information on the OS in current use included in the notice of the use state notified by the agent 705. Here, it is first determined whether the OS switching is required for the initiation of the application a.

Specifically, when it is determined that the OS switching is unnecessary for the initiation of the application a, it is adopted as the resource node 103 used for the service A, and the adoption notice is transmitted to the agent 705 (refer to (7) as shown in FIG. 9). Moreover, when it is determined that the OS switching is necessary for the initiation of the application a, the rejection notice is transmitted as the resource node 103 not used for the service A to the agent 705 (refer to (8) as shown in FIG. 9).

Figure 10:
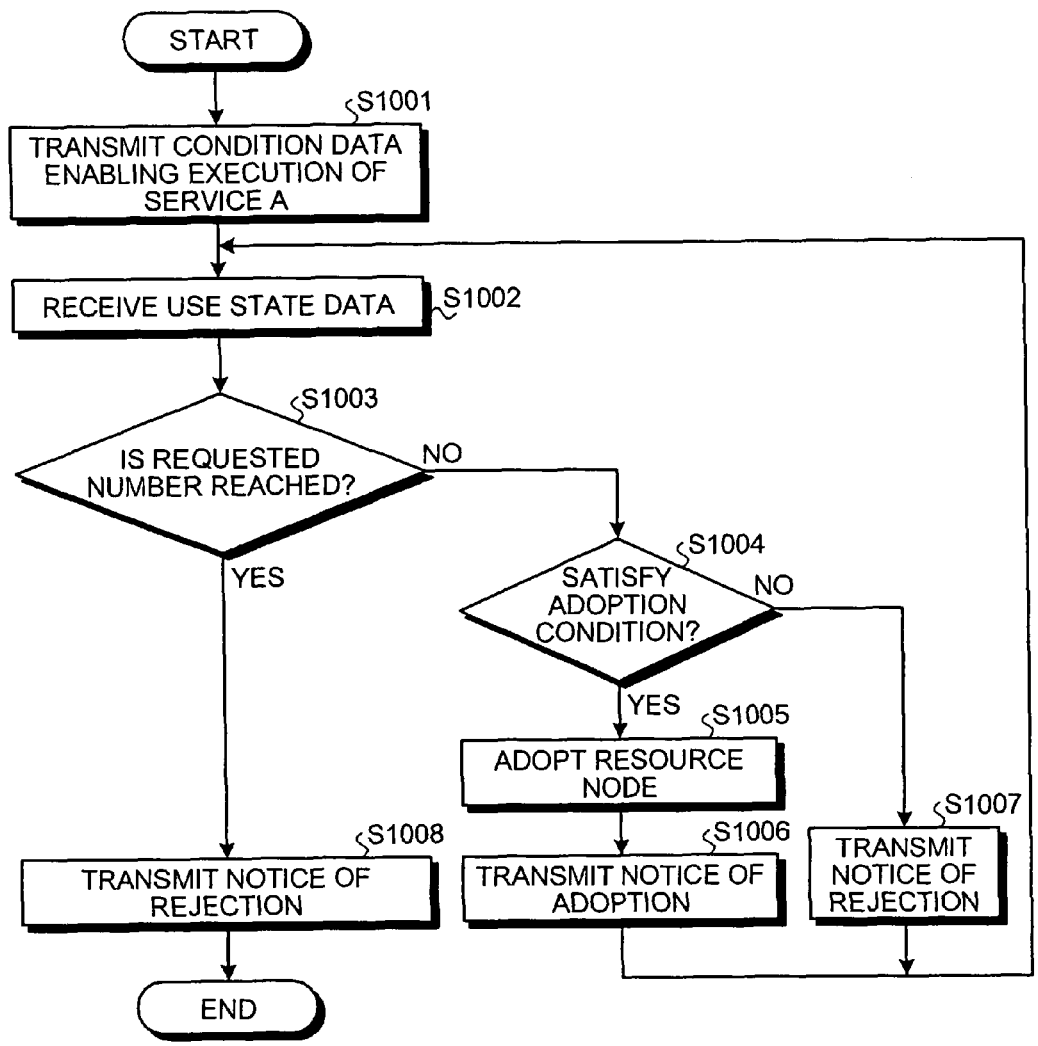
FIG. 10 is a flowchart of a resource node determination process performed by a resource node determination apparatus according to the second embodiment.

Suppose that the use state is inquired of more resource nodes 103 than the number required for the service A. FIG. 10 is a flowchart of a resource node determination process performed by the resource node determination apparatus 101 according to the second embodiment. In the flowchart of FIG. 10, first, the service managing unit MA of the resource node determination apparatus 101 transmits the condition data enabling the execution of the service A to the resource broker 702 of the resource brokering apparatus 102 (step S1001).

At step S1001, As a result of transmitting the condition data enabling the execution of the service A, the use state data is received from the agent 705 of the resource node 103 that satisfies the condition enabling the execution of the service A (step S1002). The use state data transmitted from the resource node 103 includes the information on the OS in current use in each resource node 103.

Next, it is determined whether the number of the resource node 103 used for the service A reaches the number requested as the condition (step S1003). Here, when the requested number is not reached (step S1003: NO), based on the use state data received at step S1002, it is determined whether the resource node 103 that is the transmitting origin of the use state data satisfies the adoption condition set beforehand in the service managing unit MA (step S1004).

Specifically, from the information on the OS in current use included in the use state data, it is determined whether the OS enabling the application a operation is used in the resource node 103, and thereby it is determined whether the OS switching is necessary.

Here, when the adoption condition is satisfied (step S1004: YES), the resource node 103 that is the transmitting origin of the use state data received at step S1002 is adopted as the resource node 103 used for the service A (step S1005). Specifically, when it is determined from the information on the OS in current use included in the use state data that the OS switching of OS is unnecessary, it is determined that the adoption condition is satisfied.

The adoption notice is then transmitted to the agent 705 of the adopted resource node 103 (step S1006), and the procedure proceeds to step S1002. Moreover, at step S1004, when the adoption condition is not satisfied (step S1004: NO), the rejection notice is transmitted to the resource node 103 that is the transmitting origin of the use state data received at step S1002 (step S1007) and the procedure proceeds to step S1002. Specifically, when it is determined from the information on the OS in current use included in the use state data that the OS switching is necessary, it is determined that the adoption condition is not satisfied.

Moreover, at step S1003, when the requested number is reached (step S1003: YES), the rejection notice may be transmitted to the agent 705 of the resource node 103 that is the transmitting origin of the use state data received at step S1002 (step S1008) and a series of the process may be finished.

Specifically, when the resource nodes 103 used for the service A reached the requested number, the rejection notice is transmitted to the agent 705 of the resource node 103 that has afterward transmitted the use state data.

According to this second embodiment, in consideration of the time for the initiation of the application a required for the execution of the service A in each resource node 103, the adoption of the resource node 103 used for the service may be performed. For this reason, the situation where even in the case of the quick response of the use state, it takes time for the initiation of the application a and as a result it takes time for the execution of the service A can be avoided so that the more efficient assignment of resources can be performed.

In a third embodiment of the present invention, the case in which, when the notice of the use state from the resource node 103 is received, it is not determined whether the resource node 103 is adopted, but it is temporarily adopted temporarily, and it is determined whether it is adopted depending on the subsequent situation will be described.

Figure 11:
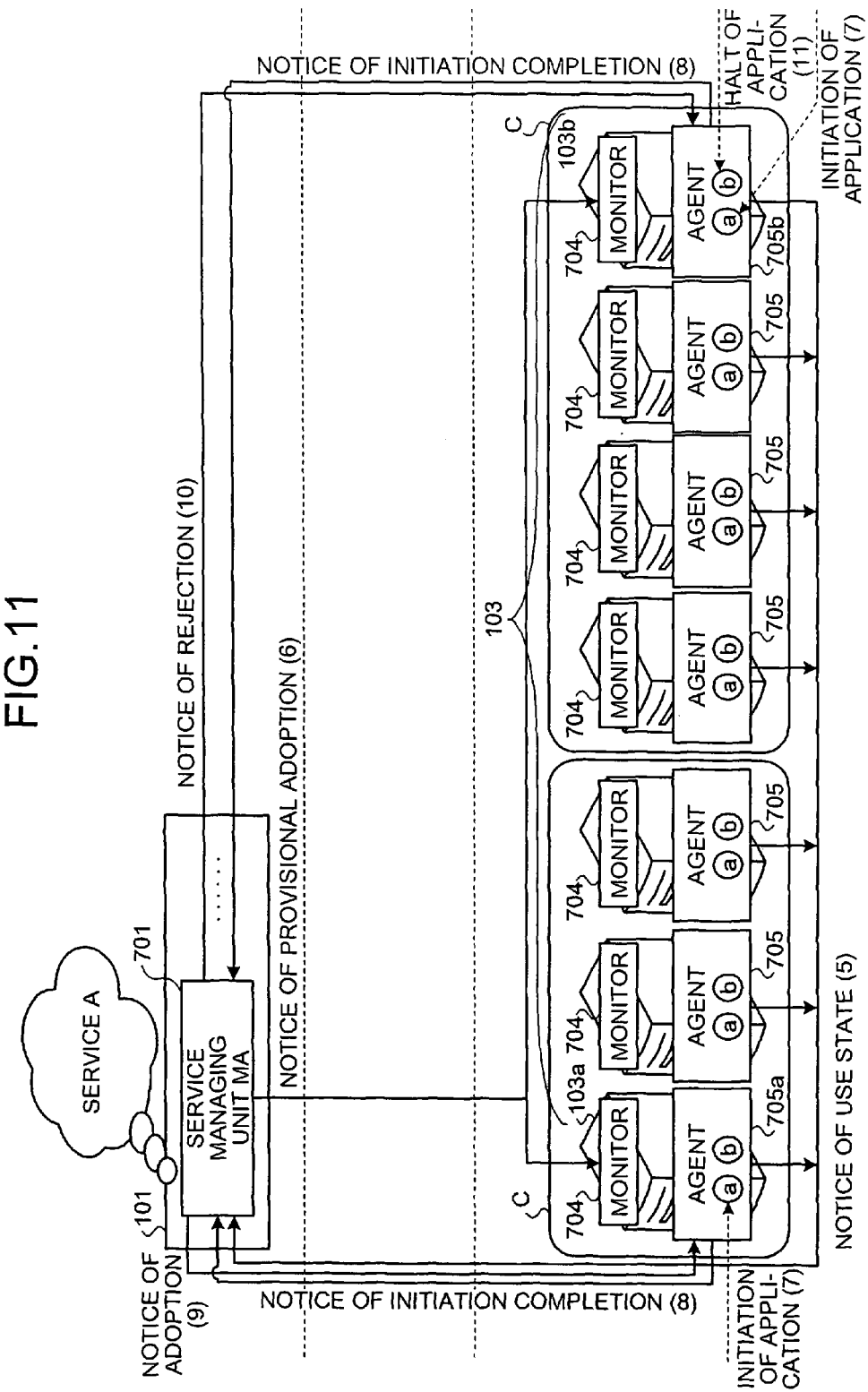
FIG. 11 is a diagram illustrating an outline of a resource node determination system according to a third embodiment of the present invention.

FIG. 11 is a diagram illustrating an outline of a resource node determination system according to the third embodiment. Note that since processing until the resource broker 702 inquires the use state of each resource node 103 is the same as the processing (1) to (4) as shown in FIG. 7, the description and illustration are omitted here.

As shown in FIG. 11, since the notice of the use state of a resource node 103a and a resource node 103b is quick, the case in which the notice of the provisional adoption is transmitted to an agent 705a of the resource node 103a and an agent 705b of the resource node 103b from the service managing unit MA will be described.

In the order of the notice of the use state from the agent 705 of the resource node 103 (refer to (5) as shown in FIG. 11), the service managing unit MA temporarily adopts it as the resource node 103 used for service A. The notice of the provisional adoption is then transmitted to the agent 705 of the temporarily adopted resource node 103.

Since the response of the notice of the use state of the resource node 103a and the resource node 103b is quick, the service managing unit MA transmits the notice of the provisional adoption to the resource node 103a and the resource node 103b (refer to (6) as shown in FIG. 11).

As a result of transmitting the notice of the provisional adoption from the service managing unit MA, the resource node 103a and the resource node 103b receive the notice of the provisional adoption. Hence, the resource node 103a and the resource node 103b will be in the state where they are temporarily adopted as the resource node 103 used for the service A.

Moreover, the agent 705a and the agent 705b that received the notice of the provisional adoption initiates the application a required for the execution of the service A (refer to (7) as shown in FIG. 11). Subsequently, when the application a is completed, the notice of the initiation completion showing the initiation completion of the application a is transmitted to the service managing unit MA (refer to (8) in FIG. 11).

Here, since the initiation of the application a in the resource node 103a is quickly completed, the notice of the initiation completion from the agent 705a is quicker than that from the agent 705b. In this case, the service managing unit MA transmits the adoption notice to the agent 705a whose notice of the initiation completion is quicker (refer to (9) in FIG. 11).

Moreover, it took time for the initiation of the application a in the resource node 103b, and therefore when the notice of the initiation completion from the agent 705b is transmitted to the service managing unit MA, the number of resource nodes 103 required for the service A has been already prepared. In this case, the service managing unit MA transmits the rejection notice to the agent 705b (refer to (10) in FIG. 11). Moreover, the agent 705b that received the rejection notice halts the application a (refer to (11) in FIG. 11), and it returns to the state before having received the notice of the provisional adoption.

Figure 12:
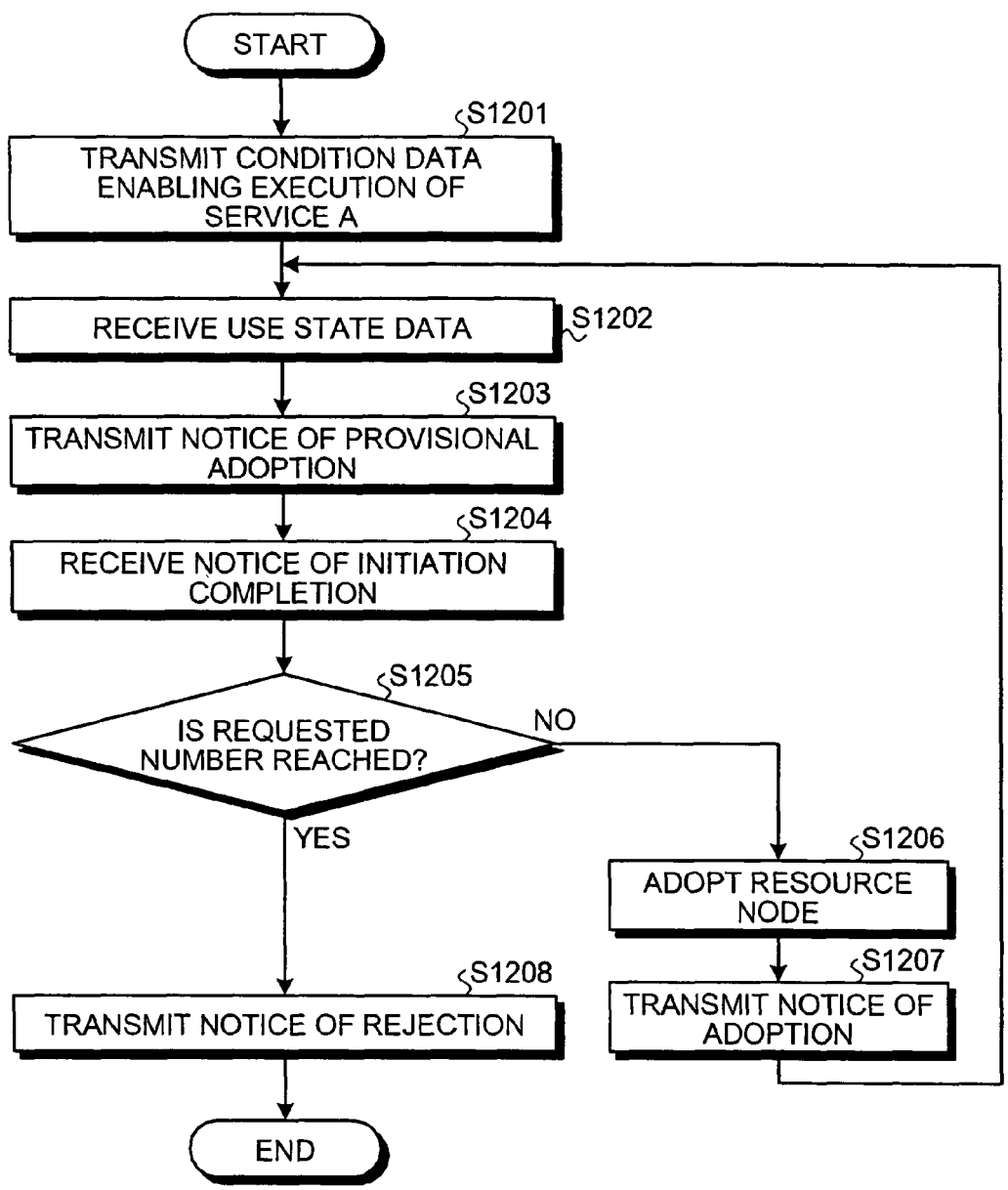
FIG. 12 is a flowchart of a resource node determination process performed by a resource node determination apparatus according to the third embodiment.

FIG. 12 is a flowchart of a resource node determination process performed by the resource node determination apparatus 101 according to the third embodiment. Here, suppose that the use state is inquired of more resource nodes 103 than the number required for the service A.

In the flowchart shown in FIG. 12, first, the service managing unit MA of the resource node determination apparatus 101 transmits the condition data enabling the execution of the service A to the resource broker 702 of the resource brokering apparatus 102 (step S1201).

At step S1201, as a result of transmitting the condition data enabling the execution of the service A, the use state data is received from the agent 705 of the resource node 103 that satisfies the condition enabling the execution of the service A (step S1202). Next, the notice of the provisional adoption is transmitted to the resource node 103 that is the transmitting origin of the use state data (step S1203).

The notice of the initiation completion is then received from the resource node 103 of the transmission destination of the notice of the provisional adoption (step S1204). Specifically, it is waited for the application a required for the execution of the service A to initiate in the resource node 103 of the transmission destination of the notice of the provisional adoption, and when it initiated, the notice of the initiation completion transmitted from the resource node 103 is received.

Next, it is determined whether the number of the resource node 103 used for the service A reaches the number requested as the condition (step S1205). Here, when the requested number is not reached (step S1205: NO), the resource node 103 that is the transmitting origin of the notice of the initiation completion received at step S1204 is adopted as the resource node 103 used for the service A (step S1206).

The adoption notice is then transmitted to the agent 705 of the adopted resource node 103 (step S1207), and the procedure proceeds to step S1202. Specifically, the resource node 103 whose transmission of the notice of the initiation completion is quicker is adopted, and the adoption notice showing that it is adopted as the resource node 103 used for the service A is transmitted.

Moreover, at step S1205, when the requested number is reached (step S1205: YES), the rejection notice is transmitted to the agent 705 of the resource node 103 that is the transmitting origin of the notice of the initiation completion received at step S1204 (step S1208) and a series of the process may be finished.

Specifically, when the resource nodes 103 used for the service A reached the requested number, the rejection notice is transmitted to the agent 705 of the resource node 103 that has afterward transmitted the notice of the initiation completion.

According to this third embodiment, in the order of the notice of the initiation completion showing that the initiation of the application a is actually completed in each resource node 103, the resource node 103 used for service A is adopted. Hence, the time required for the initiation of the application a depending on the performance and the use state of each resource node 103 can be taken into consideration, and therefore even when it is difficult to predict the time required for the initiation of the application a in each resource node 103, the assignment of resources can be effectively performed.

Note that the resource node 103 is used for a plurality of kinds of services, and therefore when two steps of resource adoption/rejection determination are performed (determine whether it is adopted after the provisional adoption described above), it is necessary that the initiation of a plurality of applications is coordinated.

The case in which the two steps of resource adoption/rejection determination are performed at the time of starting a new service A in the environment where the resource node 103 has been already used for the service B will be described. Note that it is assumed that the application required for execution of the service B is the application b.

In the resource node determination processing described above, at the time that the resource node 103 has already operated the application b for the service B, if it is adopted as the resource node 103 used for the service A, it halts the application b and initiates the application a. However, when it is formally rejected afterward, it will halt the application a and reinitiate the application b that is formerly halted.

Namely, by temporarily halting the application b that should have been halted, useless processing will be generated. If the application a and the application b can be concurrently operated, this uselessness can be avoided by initiating the application a without halting the application b that has been already initiated at the provisional adoption. Hereinafter, the concurrent operation of applications will be described with reference to FIG. 13.

Figure 13:
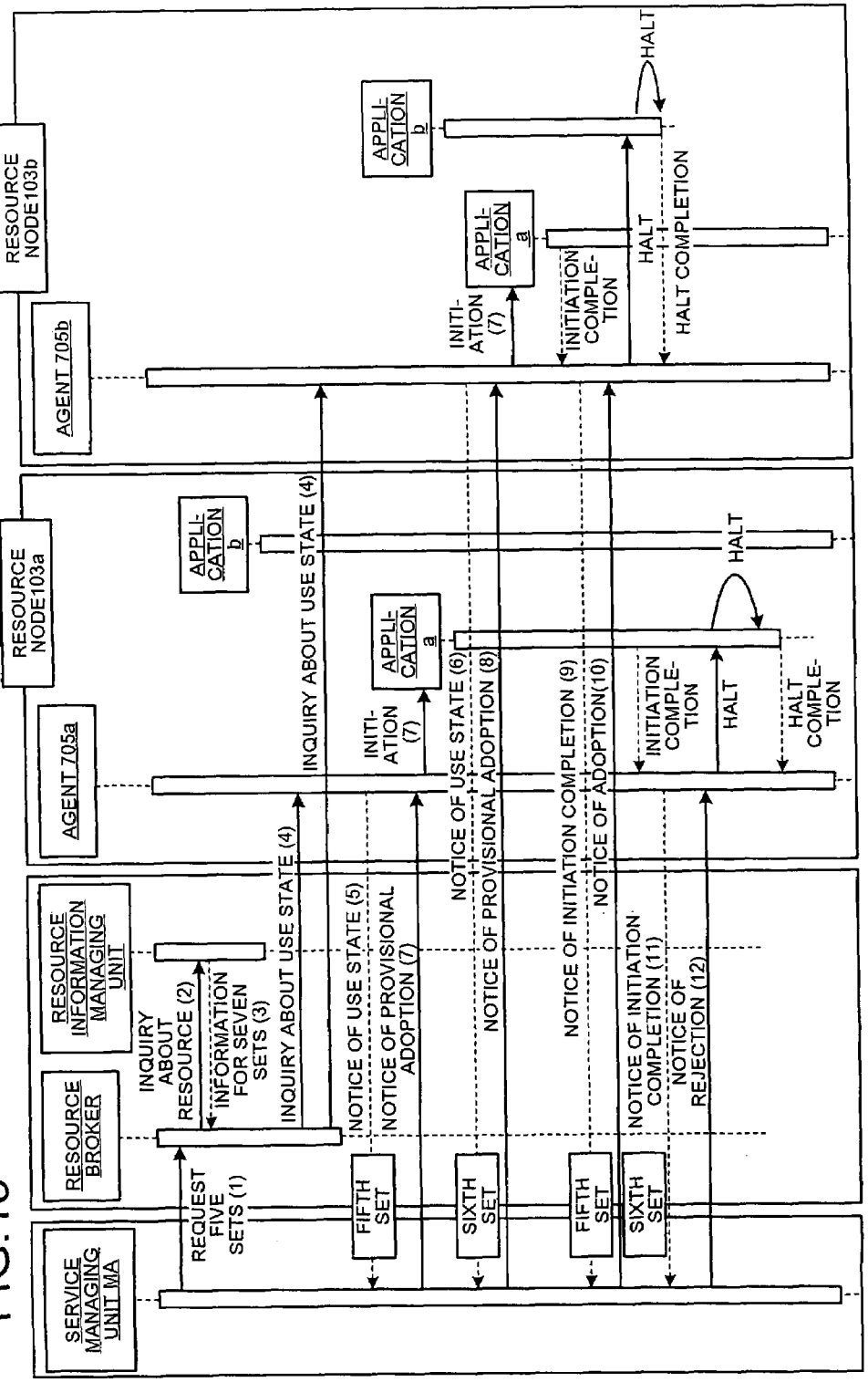
FIG. 13 is a sequence diagram of the resource node determination process according to the third embodiment.

FIG. 13 is a sequence diagram of the resource node determination process according to the third embodiment. According to the embodiment shown in FIG. 13, at the time of performing the two steps of resource adoption/rejection determination, a typical sequence of operation in the case of avoiding the useless halt of the application in the rejected resource node 103 is shown. Note herein that here, among the resource nodes 103 shown in FIG. 11, only the resource node 103a and the resource node 103b will be described.

As shown in FIG. 13, the service managing unit MA requires five resource nodes 103 having predetermined performance of the resource broker 702. Based on the resource information from the resource information managing unit 703 (here, information for seven sets), the resource broker 702 then inquires the use state of the resource node 103.

The agent 705a of the resource node 103a and the agent 705b of the resource node 103b that received the inquiry of the use state from the resource broker 702 transmit the notice of the use state showing that the initiation of the application a is possible to the service managing unit MA.

Next, the service managing unit MA transmits the notice of the provisional adoption to the agent 705a and the agent 705b. The agent 705a and the agent 705b that received the notice of the provisional adoption initiate the application a. At this time, the resource node 103a and the resource node 103b continue to hold the application b that has already initiated.

When the initiation of the application a is completed, each agent 705 then transmits the notice of the initiation completion of the application a to the service managing unit MA. Suppose that the initiation completion of the application a in the resource node 103b is quicker than that of the application a in the resource node 103a. For this reason, the service managing unit MA transmits the adoption notice to the agent 705b and the rejection notice to the agent 705a.

The agent 705b that received the adoption notice halts the application b at the time. For this reason, in the resource node 103b, only the application a has initiated and is in the state of being assigned as the resource node 103 used for the service A.

Moreover, the agent 705a that received the rejection notice halts the application a at the time. The application b originally operated is continuously operated, so that the resource node 103b would be returned to the original state (the state assigned to the service B).

As described above, at the time of the provisional adoption, by holding the initiation of the application that has already used for another service, the temporal halt of the application can be avoided. Moreover, by avoiding the temporal halt of the application, initialization processing needed at the time of the initiation and deletion processing of certain information at the time of the halt can be prevented, and thereby the load in each resource node 103 can be reduced.

As described above, according to the resource node determination program, the resource node control program, the recording medium, the resource node determination apparatus, the resource node, the resource node determination method, and the resource node control method, the smooth provision of each service can be realized.

Note herein that the resource node determination method described in the present embodiments can be realized by executing the program that is preliminarily prepared by the computer, such as a personal computer and a workstation. This program is recorded on a computer-readable recording medium, such as an HD, an FD, a CD-ROM, an MO, or a DVD, and is executed by being read from the recording medium by a computer. Moreover, this program may be a transmission media that can be distributed through networks such as the internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium that stores therein a resource node determination program causing a computer to execute:

transmitting information on a condition enabling execution of a service to a resource broker that manages assignment of resource nodes that are used for a plurality of services;

receiving information on a use state of specific nodes among the resource nodes, the specific nodes satisfying the condition; and determining a resource node to be used for the service from among the specific nodes based on the information on the use state, wherein the determining includes selecting a resource node to be used for the service from among the specific nodes according to order of reception of the information on the use state from the specific nodes until a sufficient number of resource nodes to enable execution of the service is gathered, wherein the information on the use state includes switching information indicative of whether a software resource is required to be switched, the software resource required for the execution of the service in the specific nodes, and the determining includes determining the resource node to be used for the service from among the specific nodes based on the switching information.

2. A non-transitory computer-readable recording medium that stores therein a resource node determination program causing a computer to execute:
   transmitting information on a condition enabling execution of a service to a resource broker that manages assignment of resource nodes that are used for a plurality of services;
   receiving information on a use state of specific nodes among the resource nodes, the specific nodes satisfying the condition; and
   determining a resource node to be used for the service from among the specific nodes based on the information on the use state,
   wherein the determining includes selecting a resource node to be used for the service from among the specific nodes according to order of reception of the information on the use state from the specific nodes until a sufficient number of resource nodes to enable execution of the service is gathered, wherein
   the information on the use state includes software information indicative of whether a software resource is executed, the software resource required for the execution of the service in the specific resource nodes, and
   the determining includes determining the resource node to be used for the service from among the specific nodes based on the software information.

3. A non-transitory computer-readable recording medium that stores therein a resource node determination program causing a computer to execute:
   transmitting information on a condition enabling execution of a service to a resource broker that manages assignment of resource nodes that are used for a plurality of services;
   receiving information on a use state of specific nodes among the resource nodes, the specific nodes satisfying the condition; and
   determining a resource node to be used for the service from among the specific nodes based on the information on the use state,
   wherein the determining includes selecting a resource node to be used for the service from among the specific nodes according to order of reception of the information on the use state from the specific nodes until a sufficient number of resource nodes to enable execution of the service is gathered, wherein the resource node determination program further causes the computer to execute:
   transmitting, to the specific nodes, a request for initiation of software resource required for the service in the specific nodes when the information on the use state is received; and
   receiving a notice of initiation completion from the specific nodes in response to the request, wherein
   the determining includes determining the resource node to be used for the service from among the specific nodes in sequence of reception of the notice.

4. A non-transitory computer-readable recording medium that stores therein a resource node control program causing a computer to execute:
   receiving, when a resource node performing a software resource required for execution of a first service selected from among a plurality of services satisfies a condition enabling execution of a second service that is newly selected from among the services, a request for initiation of a software resource required for execution of the second service from a determination apparatus that determines whether to use the resource node for each of the first service and the second service;
   initiating the software resource required for the execution of the second service when the request is received;
   transmitting to the determination apparatus, when the software resource required for the execution of the second service is initiated, a notice of initiation completion of the software resource required for the execution of the second service;
   receiving a result of determination whether the resource node is used for the second service from the determination apparatus, the determination made in an order in which the notice is received at the determination apparatus; and
   terminating execution of one of the software resource required for the first service and the software resource required for the second service, based on the determination.

5. The non-transitory computer-readable recording medium according to claim 4, wherein when the received result indicates use of the resource node for the second service, the terminating includes terminating the execution of the software resource required for the first service.

6. The non-transitory computer-readable recording medium according to claim 4, wherein when the received result indicates rejection of use of the resource node for the second service, the terminating includes terminating the execution of the software resource required for the second service.

7. A resource node comprising:
   a first receiving unit that receives, when a resource node performing a software resource required for execution of a first service selected from among a plurality of services satisfies a condition enabling execution of a second service that is newly selected from among the services, a request for initiation of a software resource required for execution of the second service from a determination apparatus that determines whether to use the resource node for each of the first service and the second service;
   an initiating unit that initiates the software resource required for the execution of the second service when the request is received;
   a transmitting unit that transmits to the determination apparatus, when the software resource required for the execution of the second service is initiated, a notice of initiation completion of the software resource required for the execution of the second service;
   a second receiving unit that receives a result of determination whether the resource node is used for the second service from the determination apparatus, the determination made in an order in which the notice is received at the determination apparatus; and
   a terminating unit that terminates execution of one of the software resource required for the first service and the software resource required for the second service, based on the determination.

8. A resource node control method comprising:
   receiving, when a resource node performing a software resource required for execution of a first service selected from among a plurality of services satisfies a condition enabling execution of a second service that is newly selected from among the services, a request for initiation of a software resource required for execution of the second service from a determination apparatus that determines whether to use the resource node for each of the first service and the second service;

initiating the software resource required for the execution of the second service when the request is received;

transmitting to the determination apparatus, when the software resource required for the execution of the second service is initiated, a notice of initiation completion of the software resource required for the execution of the second service;

receiving a result of determination whether the resource node is used for the second service from the determination apparatus, the determination made in an order in which the notice is received at the determination apparatus; and terminating execution of one of the software resource required for the first service and the software resource required for the second service, based on the determination.

* * * * *